United States Patent
Lin

(10) Patent No.: US 12,443,192 B2
(45) Date of Patent: Oct. 14, 2025

(54) METHOD FOR DETECTING PHYSICAL FORBIDDEN ZONE AND GLOBAL RELOCATING OF SERVICE ROBOT

(71) Applicant: LONGTO (SUZHOU) CO., LTD, Jiangsu (CN)

(72) Inventor: Rui Lin, Jiangsu (CN)

(73) Assignee: LONGTO (SUZHOU) CO., LTD, Suzhou (CN)

( * ) Notice: Subject to any disclaimer, the term of this patent is extended or adjusted under 35 U.S.C. 154(b) by 310 days.

(21) Appl. No.: 18/130,701

(22) Filed: Apr. 4, 2023

(65) Prior Publication Data

US 2023/0244239 A1 Aug. 3, 2023

Related U.S. Application Data

(63) Continuation of application No. PCT/CN2021/118027, filed on Sep. 13, 2021.

(30) Foreign Application Priority Data

Mar. 1, 2021 (CN) .......................... 202110225310.3

(51) Int. Cl.
G05D 1/00 (2024.01)
(52) U.S. Cl.
CPC ......... *G05D 1/0214* (2013.01); *G05D 1/0223* (2013.01); *G05D 1/0234* (2013.01);
(Continued)
(58) Field of Classification Search
CPC .. G05D 1/0214; G05D 1/0223; G05D 1/0234; G05D 1/0246; G05D 1/0263;
(Continued)

(56) References Cited

U.S. PATENT DOCUMENTS

| | | | |
|---|---|---|---|
| 2006/0020370 A1 | 1/2006 | Abramson | |
| 2014/0180478 A1* | 6/2014 | Letsky | ..................... E01H 5/00 |
| | | | 700/258 |
| 2016/0100522 A1* | 4/2016 | Yamauchi | ............ G05D 1/0219 |
| | | | 701/25 |

FOREIGN PATENT DOCUMENTS

| | | | |
|---|---|---|---|
| CN | 106155049 A | 11/2016 | |
| CN | 207224024 U | 4/2018 | |
| | (Continued) | | |

OTHER PUBLICATIONS

English translation of CN-110319834-A (Year: 2025).*
International Search Report of PCT/CN2021/118027.
Written Opinion of PCT/CN2021/118027.

*Primary Examiner* — Scott A Browne
*Assistant Examiner* — Shahira Baajour

(57) ABSTRACT

The present disclosure provides a method for detecting a physical forbidden zone and global relocating of a service robot, the method comprising: presetting an identification on an edge of the physical forbidden zone that the service robot cannot enter in a working scenario; constantly detecting whether there is an artificial identification in the working scenario during operations of the service robot; identifying the artificial identification and confirming a position and heading angle information of the service robot relative to the artificial identification when there is artificial identification information in the working scenario; controlling a motion trajectory of the service robot according to the position and heading angle information of the service robot relative to the artificial identification to forbid the service robot from entering a respective physical forbidden zone.

2 Claims, 2 Drawing Sheets

(52) U.S. Cl.
    CPC ......... *G05D 1/0246* (2013.01); *G05D 1/0263*
            (2013.01); *G05D 1/028* (2013.01)

(58) Field of Classification Search
    CPC .. G05D 1/0261; G05D 1/0274; G05D 1/0236;
            G05D 1/0221; G05D 1/0231; G05D
            1/024; G05D 1/0253; G05D 1/0276;
                Y02D 30/70; G01S 5/02
    See application file for complete search history.

(56) References Cited

FOREIGN PATENT DOCUMENTS

| | | |
|---|---|---|
| CN | 110319834 A | 10/2019 |
| CN | 111443713 A | 4/2020 |
| CN | 113050626 A | 6/2021 |

\* cited by examiner

METHOD FOR DETECTING PHYSICAL FORBIDDEN ZONE AND GLOBAL RELOCATING OF SERVICE ROBOT

CROSS-REFERENCE TO RELATED APPLICATIONS

This application is a national stage application of PCT/CN2021/118027. This application claims priorities from PCT Application No. PCT/CN2021/118027, filed Sep. 13, 2021, and from the Chinese patent application 202110225310.3 filed Mar. 1, 2021, the content of which are incorporated herein in the entirety by reference.

TECHNICAL FIELD

The present disclosure relates to a method for detecting a physical forbidden zone and global relocating of a service robot, and belongs to the technical field of intelligent control.

BACKGROUND

At present, service robots have been widely used in commercial scenarios, such as commercial promotion robots, commercial cleaning robots, shopping guide robots, and supermarket delivery robots, which mainly achieve intelligent applications of serving consumers in the commercial scenarios. With the development of technology, because of having increasingly high intelligence and performance-price ratios, as well as the high promotion of brand images for users, the service robots are also loved and welcomed by the consumers, and are more and more applied to various commercial scenarios.

Due to the presence of steps, escalators, elevators and various entertainment devices in the commercial scenarios, and that there are many people and even children running around, the environment is often complex, sometimes resulting in very narrow passages for the service robots to travel, or even no way to walk. However, when performing various set service tasks in the commercial scenarios, the service robots must first ensure the safety of operations without safety accidents, and cannot actively collide with pedestrians, especially the elderly and children, cannot fall from steps, and cannot run onto the escalators to cause falls. Especially for facilities such as escalators in supermarkets, because they are constantly moving devices and there are relative height differences between the steps, the service robots generally cannot stand still on the escalators, and traditional fall prevention sensors or cliff sensors installed downward on the service robots are also not effective in preventing falls.

However, the traditional way of setting forbidden zones and forbidden lines through software can only work when the service robots are located accurately. When dynamic changes of the environment are relatively large, the service robots are easy to lose their locations and get lost, so it is impossible to limit the service robots to run over the steps and travel to dangerous forbidden zones such as escalators by means of the method of setting forbidden zones and forbidden lines through software.

Therefore, a new and effective method that can prevent the service robots from entering the dangerous zones to ensure the safety of operations when tasks are performed in complex scenarios, and help the service robots recover accurate locations at the same time is very important and indispensable to improve the safety, intelligence and environmental adaptability of the service robots.

SUMMARY

In order to solve one of the above technical problems, the present disclosure provides a method for detecting a physical forbidden zone and global relocating of a service robot.

According to one aspect of the present disclosure, there is provided a method for detecting a physical forbidden zone and global relocating of a service robot, the method including:

presetting an artificial identification on an edge of the physical forbidden zone that the service robot cannot enter in a working scenario;

constantly detecting whether there is the artificial identification in the working scenario during operations of the service robot;

identifying the artificial identification and confirming a position and heading angle information of the service robot relative to the artificial identification when there is artificial identification information in the working scenario;

controlling a motion trajectory of the service robot according to the position and heading angle information of the service robot relative to the artificial identification to forbid the service robot from entering a respective physical forbidden zone; and acquiring a possible position and heading angle range of the service robot in a global map of the working scenario according to an absolute position of the artificial identification in the global map, and applying a global location algorithm so as to achieve an accurate global relocation of the service robot.

According to the method for detecting a physical forbidden zone and global relocating a service robot of at least one embodiment of the present disclosure, the artificial identification is preset on the edge of the physical forbidden zone that the service robot cannot enter in the working scenario, and when a distance between the service robot and the artificial identification is within a preset range, the artificial identification is detected by a detection apparatus of the service robot.

According to the method for detecting a physical forbidden zone and global relocating of a service robot of at least one embodiment of the present disclosure, the artificial identification includes a combination of any one or more of an RFID tag, a UWB tag, a magnetic strip, a two-dimensional code or a special identification card with alternate colors; and the detection apparatus includes one or more of an RFID reader, a UWB base station, a Hall sensor, a camera and an image processing module, where the detection apparatus includes the RFID reader when the artificial identification includes the RFID tag;

the detection apparatus includes the UWB base station when the artificial identification includes the UWB tag;

the detection apparatus includes the Hall sensor when the artificial identification includes the magnetic strip; and the detection apparatus includes the camera and the image processing module when the artificial identification includes the two-dimensional code or the color identification card.

According to the method for detecting a physical forbidden zone and global relocating of a service robot of at least one embodiment of the present disclosure, the RFID tag is installed on the edge of the physical forbidden zone, and the RFID tag stores absolute global position information of the current RFID tag in the working scenario; the absolute global position information of the current RFID tag in the working scenario stored in the RFID tag is acquired when the RFID reader of the service robot is within a certain range from the RFID tag; and the possible position and heading angle range of the service robot in the global map of the working scenario are confirmed according to the absolute global position information in the current RFID tag.

According to the method for detecting a physical forbidden zone and global relocating of a service robot of at least one embodiment of the present disclosure, the UWB tag is installed on the edge of the physical forbidden zone in the working scenario, and the UWB tag stores absolute global position information of the current UWB tag in the working scenario; the UWB base station of the service robot is used to receive an ID number of the UWB tag sent by each UWB tag at a certain frequency and a distance from the UWB base station, the UWB base station acquiring the possible position and heading angle range of the service robot in the global map of the working scenario according to a value of the distance between at least one UWB tag and the UWB base station and according to a triangulation method.

According to the method for detecting a physical forbidden zone and global relocating of a service robot of at least one embodiment of the present disclosure, the magnetic strip is installed on a ground edge of the physical forbidden zone in the working scenario, and when the Hall sensor of the service robot detects that the magnetic strip is set on the ground, the service robot is controlled to stop moving forward, and the service robot is controlled to move in an opposite direction along the motion trajectory close to the magnetic strip, so as to stay away from the physical forbidden zone, thereby preventing the service robot from entering a dangerous zone.

According to the method for detecting a physical forbidden zone and global relocating of a service robot of at least one embodiment of the present disclosure, there is a preset safe and effective distance between the magnetic strip and the edge of the physical forbidden zone, the value of the safe and effective distance being determined according to a deceleration distance of the service robot and a response speed of the detection apparatus.

According to the method for detecting a physical forbidden zone and global relocating of a service robot of at least one embodiment of the present disclosure, the two-dimensional code or the color identification card is set on a ground edge or vertical surface of the physical forbidden zone in the working scenario, and when an image captured by the camera of the service robot includes the two-dimensional code or the special identification card having alternate colors, according to the image captured by the camera, an image coordinate of the two-dimensional code or the special identification card having alternate colors is extracted by the image processing module of the service robot, and converted by a conversion matrix from an image coordinate system to a coordinate system of the service robot, so as to acquire the possible position and heading angle range of the service robot in the global map of the working scenario.

According to the method for detecting a physical forbidden zone and global relocating of a service robot of at least one embodiment of the present disclosure, the controlling a motion trajectory of the service robot according to the position and heading angle information of the service robot relative to the artificial identification to forbid the service robot from entering a respective physical forbidden zone includes:

controlling a motion speed and direction of the service robot according to a relative position and heading angle information of the service robot relative to the artificial identification to avoid dangerous accidents when the service robot travels into the physical forbidden zone in the working scenario.

According to the method for detecting a physical forbidden zone and global relocating of a service robot of at least one embodiment of the present disclosure, the accurate global relocation of the service robot includes:

S1. Acquiring data of a navigation sensor at a current time frame of the service robot, and on the basis of a built global map and the navigation sensor data at the current time frame, applying a Monte Carlo location algorithm so as to acquire an optimal pose estimation at the current time frame;

S2. Calculating a global location score $\Psi_k$ at the current time frame k according to the optimal pose estimation $P_k=[p_k \ q_k \ \theta_k]^T$ at the current time frame k; and S3. The global location score at the current time frame being greater than a certain threshold, indicating that the relocation of the service robot based on the artificial identification of the physical forbidden zone is accurate and the service robot is recovered from an abnormal state.

BRIEF DESCRIPTION OF DRAWINGS

The accompanying drawings illustrate exemplary embodiments of the present disclosure and, together with their descriptions, serve to explain the principles of the present disclosure, and are included to provide a further understanding of the present disclosure. The accompanying drawings are included in the specification and constitute a part of the specification.

DETAILED DESCRIPTION OF THE EMBODIMENTS

The present disclosure will be further described in detail below in combination with the accompanying drawings and embodiments. It is understood that the specific embodiments described herein are only used to explain the related contents, but not to limit the present disclosure. In addition, it should be noted that, for the convenience of description, only the parts related to the present disclosure are shown in the accompanying drawings.

Figure 1:
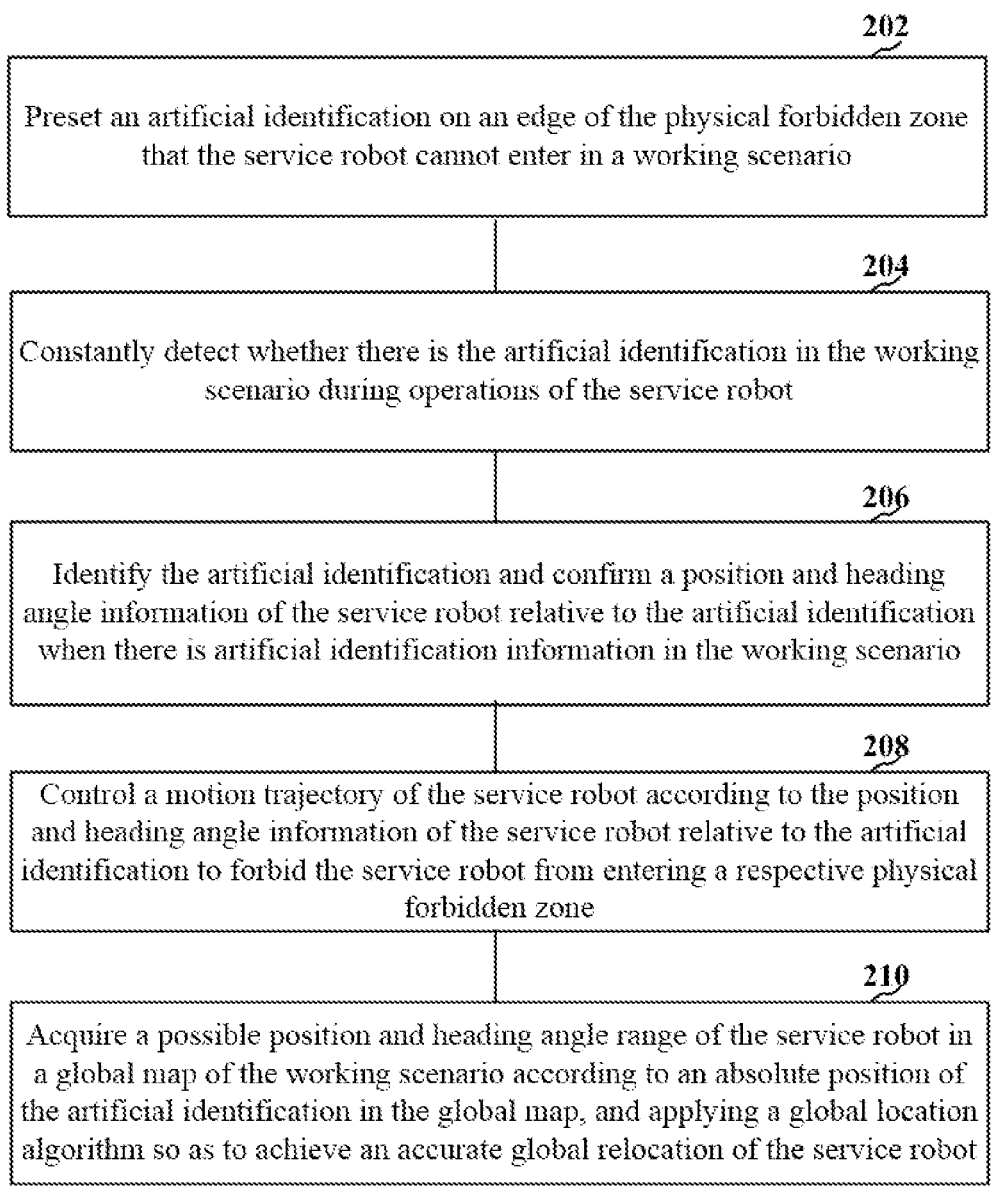
FIG. 1 is a flow chart of a method for detecting a physical forbidden zone and global relocating of a service robot according to one embodiment of the present disclosure.
Figure 2:
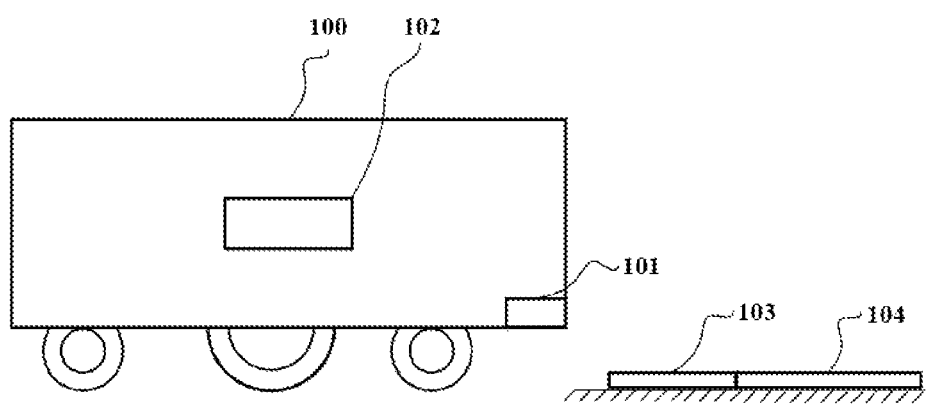
FIG. 2 is a schematic diagram of a service robot according to one embodiment of the present disclosure.

FIG. 1 is a flowchart of a method for detecting a physical forbidden zone and global relocating of a service robot according to one embodiment of the present disclosure.

The method for detecting a physical forbidden zone and global relocating of a service robot as shown in FIG. 1, the method includes:

202. An artificial identification is preset on an edge of the physical forbidden zone that the service robot cannot enter in a working scenario;

204. Whether there is the artificial identification in the working scenario during operations of the service robot is constantly detected;

206. The artificial identification is identified and a position and heading angle information of the service robot relative to the artificial identification are confirmed when there is artificial identification information in the working scenario;

208. A motion trajectory of the service robot is controlled according to the position and heading angle information of the service robot relative to the artificial identification to forbid the service robot from entering a respective physical forbidden zone; and 210. A possible position and heading angle range of the service robot in a global map of the working scenario is acquired according to an absolute position of the artificial identification in the global map, and a global location algorithm is applied so as to achieve an accurate global relocation of the service robot.

In the present disclosure, when the service robots runs in scenarios, due to the presence of steps, escalators, elevators and various entertainment devices, for the fixed dangerous zones that the robots cannot enter, it is generally possible to forbid the service robots from entering these dangerous zones by means of setting virtual forbidden zones or forbidden lines in global map editing software of the service robots. This setting strategy is commonly used in household floor cleaning robots.

However, considering that in the public zones such as supermarkets and office buildings, there are many people and complex environments, and sensors of the service robots are often blocked by walking customers, resulting in that global locations of the service robots are not very accurate, and that sometimes the service robots even completely get lost. Especially for the symmetrical and similar environments in the supermarkets and office buildings, the service robots are easier to get lost.

When such case happens, the virtual forbidden zones or forbidden lines set in maps of the service robots do not work. At this time, the service robots may travel into the dangerous zones such as steps, escalators, and elevators, resulting in safety accidents.

Through the tangible artificial identification, the present disclosure can divide the physical forbidden zone from a working zone of the service robot, and effectively prevent the service robot from entering these physical forbidden zones to avoid the occurrence of the safety accidents.

In particular, since the absolute position of the artificial identification in the global map is known, the possible position and heading angle range of the service robot in the global map of the working scenario may be further acquired, so that the global location algorithm may be applied so as to achieve the accurate global relocation of the service robot.

Preferably, the artificial identification is preset on the edge of the dangerous zone that the service robot cannot enter in the working scenario, such as a ground edge or vertical surface of the physical forbidden zone, and when a distance between the service robot and the artificial identification is within a preset range, i.e. an effective working range of an apparatus for detecting the physical forbidden zone of the service robot, the artificial identification is detected by the detection apparatus of the service robot.

The artificial identification includes a combination of any one or more of an RFID tag, a UWB tag, a magnetic strip, a two-dimensional code or a special identification card with alternate colors; the detection apparatus includes one or more of an RFID reader, a UWB base station, a Hall sensor, a camera and an image processing module, where the detection apparatus includes the RFID reader when the artificial identification includes the RFID tag;

the detection apparatus includes the UWB base station when the artificial identification includes the UWB tag;

the detection apparatus includes the Hall sensor when the artificial identification includes the magnetic strip; and the detection apparatus includes the camera and the image processing module when the artificial identification includes the two-dimensional code or the color identification card.

That is, when selecting a different artificial identification, it is necessary to select the detection apparatus corresponding to the artificial identification.

The following is combined with the specific description of the artificial identification: 206. The artificial identification is identified and a position and heading angle information of the service robot relative to the artificial identification are confirmed when there is artificial identification information in the working scenario;

In the present disclosure, the possible position and heading angle information of the service robot relative to the artificial identification are characterized as:

$$\Omega_k = \{[x_k y_k \alpha_k]^T | x_k \in [x_{min} x_{max}] y_k \in [y_{min} y_{max}] \alpha_k \in [\alpha_{min} \alpha_{max}]\}$$

where $[x_{min}\ x_{max}]$, $[y_{min}\ y_{max}]$, $[\alpha_{min}\ \alpha_{max}]$ are the possible position range and heading angle range of the corresponding service robot in forward, lateral directions and the like calculated and determined by the detection apparatus for detecting the artificial identification.

As an implementation, the RFID tag is installed on the edge of the physical forbidden zone in the working scenario, and the RFID tag stores position information of the current RFID tag in the space; absolute position information of the current RFID tag in the working scenario stored in the RFID tag is acquired when the RFID reader of the service robot is within a certain range from the RFID tag; and the position and heading angle range of the service robot in the global map of the working scenario are acquired according to the position information in the current RFID tag.

That is, the RFID reader can be installed on an end of the service robot, for example, the front bottom, an effective detection distance thereof being several tens of centimeters, and a response time being within 1 s.

When the RFID tag is within the effective detection range and the RFID reader detects that there is RFID tag information, it is indicated that the service robot is about to travel into the physical forbidden zone.

Certainly, the detection direction and scope of the RFID tag information can be limited by adjusting the position of the RFID tag and the installation position and direction of the RFID reader of the service robot.

In another aspect, the UWB tag is installed on the edge of the physical forbidden zone in the working scenario, and the UWB tag stores absolute position information of the current UWB tag in the working scenario; the UWB base station of the service robot is used to receive an ID number of the UWB tag sent by each UWB tag at a certain frequency and a distance from the UWB base station, the UWB base station acquiring the possible position and heading angle range of the service robot in the global map of the working scenario according to a value of the distance between at least one UWB tag and the UWB base station and according to methods such as triangulation.

That is, considering that the UWB tag requires power supply, in order to improve the battery life, the UWB tag is generally set to work in a low power consumption mode, for example, the data transmission frequency is set to 1 Hz.

The UWB base station of the service robot receives data sent by the UWB tag in real time, and acquires the relative distance of the UWB tag relative to the UWB base station, i.e., the service robot and ID number information of the UWB tag, and the service robot integrates the data sent by multiple UWB tags, that is, thus the possible position and heading angle range of the service robot in the global map of the working scenario can be judged according to the methods such as triangulation; and on the basis of this possible position and heading angle range, the service robot can be enabled to execute a global location algorithm, such as a Monte Carlo global location algorithm, to achieve the accurate global relocation of the service robot, so that the service robot can recover from an abnormal state, such as getting lost.

In another aspect, the magnetic strip is installed on a ground edge of the physical forbidden zone, and when the Hall sensor of the service robot detects that the magnetic strip is set on the ground, the service robot is controlled to forbid moving forward, and the service robot is controlled to move in an opposite direction along the motion trajectory close to the magnetic strip, so as to stay away from the physical forbidden zone.

Preferably, considering the effective detection distance and response time, the Hall sensor is generally installed in front of the front bottom caster of the service robot, and the distance between the Hall sensor and the caster needs to comprehensively consider an emergency braking distance of the service robot.

Preferably, there is a preset distance between the magnetic strip and the edge of the physical forbidden zone, so as to ensure that the service robot does not travel into the physical forbidden zone at all.

In the present disclosure, the two-dimensional code or the special identification card with alternate colors is set on a ground edge or vertical surface of the physical forbidden zone in the working scenario, and when an image collected by the camera of the service robot includes the two-dimensional code or the special identification card with alternate colors, according to the image collected by the camera, an image coordinate of the two-dimensional code or the special identification card with alternate colors is extracted by the image processing module of the service robot, and converted by a conversion matrix from an image coordinate system to a coordinate system of the service robot, so as to acquire the possible position and heading angle range of the service robot. And based on the possible position and heading angle range of the service robot, a global location algorithm is applied, so as to acquire a global optimal pose estimation of the service robot based on the global map of the working scenario.

Preferably, that a motion trajectory of the service robot is controlled according to the position and heading angle information of the service robot relative to the artificial identification to forbid the service robot from entering a respective physical forbidden zone includes:

controlling a motion speed and direction of the service robot according to a relative position and heading angle information of the service robot relative to the artificial identification to avoid dangerous accidents when the service robot travels into the physical forbidden zone in the working scenario.

According to another aspect of the present disclosure, a service robot is provided, mainly performing promotion, shopping guide and cleaning tasks in commercial scenarios such as supermarkets and office buildings. The service robot includes a robot body 100 and a detection apparatus 101. The detection apparatus 101 is not limited to being installed at the lower part or the front end of the service robot body, and mainly performs detection of the artificial identification, identification and location relative to the service robot.

A controller 102 is installed inside the service robot body 100, to control the relative movement of the service robot body, including front, back, left, right, etc., and to control the service robot 100 to make corresponding avoidance movement strategies by receiving information of the detection apparatus 101 in real time and according to the position of the artificial identification relative to the service robot 100 therein.

The controller 102 of the service robot may, on the basis of the information of the detection apparatus 101, make the service robot recalculate the global optimal pose estimation of the service robot after getting lost and other states, to find its own accurate pose.

The artificial identification 103 represents the area of the physical forbidden zone 104, and is not limited to being installed on the ground before or the vertical surface beside the area requiring to set up physical forbidden zone 104. The physical forbidden zone 104 is mainly used to characterize a dangerous zone that the service robot 100 must not travel into.

In the present disclosure, after acquiring the position and heading angle range of the service robot in the global map of the working scenario, on the basis of the possible position and heading angle range of the service robot, the global location algorithm, such as a Monte Carlo global positioning algorithm, is applied so as to achieve the accurate global relocation of the service robot, and enable the service robot to recover from an abnormal state, such as getting lost.

Specifically, the accurate global relocation of the service robot includes:

S1. Data of a navigation sensor at a current time frame of the service robot is acquired, such as laser data, and on the basis of a built global map and the laser data at the current time frame, a Monte Carlo location algorithm is applied so as to acquire an optimal pose estimation at the current time frame;

S2. A global location score $\Psi_k$ at the current time frame is calculated k according to the optimal pose estimation $P_k=[P_k \ q_k \ \theta_k]^T$ at the current time frame k; and S3. The global location score at the current time frame is greater than a certain threshold, i.e., $\Psi_k > \Psi_{threshold}$, it is indicated that the relocation of the service robot based on the artificial identification of the physical forbidden zone is accurate and the service robot is recovered from an abnormal state, such as getting lost.

As a result, the service robot of the present disclosure can achieve that after the detection apparatus detects the artificial identification on the edge of the physical forbidden zone, so as to acquire the possible position and heading angle range of the service robot in the global map of the scenario, the service robot acquires the accurate global location, and can further enable the service robot to recover from the abnormal state, such as getting lost.

The following describes in detail various steps of the present disclosure in combination with specific examples.

S1. Data of a navigation sensor at a current time frame of the service robot is acquired, such as laser data, and on the basis of a built global map and the laser data at the current time frame, a Monte Carlo location algorithm is applied so as to acquire an optimal pose estimation at the current time frame.

Through a navigation 2D laser sensor of the service robot, the surrounding working scenario is constantly scanned to acquire the laser data of each time frame, which is characterized as $\{LD|\{\lambda_{k,n},n\}, n=1 \ldots N\}$, where $\lambda_{k,n}$ is a polar coordinate distance of a corresponding laser point k, n is a serial number of laser points in k time frame, N is a total number of the laser points in the time frame k, a corresponding angle of each discrete point is $n \cdot \Delta\delta$, and $\Delta\delta$ is a laser angular resolution. These discrete laser data points are generally 2D sectors.

In the stored global map of the scenario $\{M|\{\chi_{u,v}\}, [u, v]^T \in \mathbb{R}\} m \chi_{u,v}$ represents a value of a grid point $[u, v]^T$ in the 2D global map of the scenario, and $\mathbb{R}$ R is a grid point set of the two-dimensional map, considering that a general laser sensor builds a 2D grid map, that is, fixed road signs in the scenario (obstacle zones), drivable zones (no obstacle zone), etc. are discretized into grid sets of a certain size and projected on a laser scanning plane. Generally, 1 means there is an obstacle, and 0 means there is no obstacle. Considering an effective scanning range of the laser, an undetermined zone is characterized by −1, and the expression thereof is:

$$\chi_{u,v} = \begin{cases} 1 & \text{obstacle} \\ 0 & \text{obstacle} \\ -1 & \text{undetermined zone} \end{cases} \quad [u, v]^T \in \mathbb{R}$$

In the working scenario, the service robot constantly detects the artificial identification by the detection apparatus for detecting the physical forbidden zone, calculates the position and heading angle information of the service robot relative to the artificial identification, and acquires the possible position and heading angle of the service robot in the global map according to the global absolute position of the artificial identification in the working scenario.

According to the data of the navigation sensor at the current time frame, such as the laser data, the built global map, and the possible position and heading angle $$\Omega_k = \{[x_k y_k \alpha_k]^T | x_k \in [x_{min}, x_{max}], y_k \in [y_{min}, y_{max}], \alpha_k \in [\alpha_{min}, \alpha_{max}]\}$$

in the global map, the service robot applies the Monte Carlo location algorithm so as to determine the global optimal pose estimation at the current time frame of the service robot relative to a given scenario map, and achieve the accurate global location, which is characterized as: $P_k = [p_k \; q_k \; \theta_k]^T$, where $p_k$ and $q_k$ represent a coordinate position of the service robot in a global coordinate system at the time frame k, and $\theta_k$ represents the heading angle of the service robot in the global coordinate system at the time frame k.

S2. A global location score $\Psi_k$ at the current time frame k is calculated according to the optimal pose estimation $P_k = [p_k \; q_k \; \theta_k]^T$ at the current time frame k.

In order to evaluate whether the optimal pose estimation at the current time frame k is accurate and reliable, a judgment criterion and method need to be defined. The present disclosure is based on the optimal pose estimation $P_k = [p_k \; q_k \; \theta_k]^T$ at the current time frame k, projecting the laser data $\{LD|\{\lambda_{k,n}, n\}, n=1 \ldots N\}$ at the current time frame k into the built global map of the scenario $\{M|\{\chi_{u,v}\}, [u,v]^T \in \mathbb{R}\}$, and calculating the number of laser data points coincident with map grid points.

First, the laser data points are projected to the global coordinate system based on the global optimal pose estimation at the current time frame. The position of the global coordinate system corresponding to each laser discrete point of laser data at the current time frame is: k $$u = \frac{1}{\Delta w}\left[p_k + \lambda_{k,n} \cdot \cos\left(\theta_k + n \cdot \Delta \delta - \frac{\pi}{2}\right)\right]$$
$$v = \frac{1}{\Delta w}\left[q_k + \lambda_{k,n} \cdot \sin\left(\theta_k + n \cdot \Delta \delta - \frac{\pi}{2}\right)\right] \quad n = 1 \ldots N$$

where $\Delta w$ is a physical width of a grid in the global map of the scenario, $\Delta \delta$ is the laser angular resolution, $\lambda_{k,n}$ is a corresponding coordinate distance of the laser polars, and $P_k = [P_k \; q_k \; \theta_k]^T$ is the global optimal pose estimation at the current time frame k.

Second, the number of the laser data points that coincide with the grid points in the global map of the scenario is counted:

$$\Psi_k = \sum_{n=0}^{N} I_{u,v} \quad \text{if } \chi_{u,v} = 1 \; I_{u,v} = 1 \; \text{else} \; I_{u,v} = 0$$

Theoretically, for absolutely static scenarios, if the global location of the service robot is accurate, each laser point acquired at each time frame should coincide with a grid point in the map $\chi_{u,v}=1$, that is, a statistical global location score $\Psi_k=N$. However, considering two factors, one being that the global location of the service robot is not absolutely accurate, and the other being that the working scenario is not absolutely static, for example, there are some dynamic pedestrians, thus generally $\Psi_k<N$. Certainly, the larger $\Psi_k$ is, the more accurate and reliable the optimal pose estimation at the time frame k is.

S3. The global location score at the current time frame is greater than a certain threshold, i.e., $\Psi_k \Psi_{threshold}$, it is indicated that the relocation of the service robot based on the artificial identification of the physical forbidden zone is accurate and the service robot is recovered from an abnormal state, such as getting lost.

In general, when the service robot performs tasks in the working scenario, it is a process of performing global location in real time, that is the service robot constantly acquires the accurate global pose estimation $P_k=[p_k \; q_k \; \theta_k]^T$ at the current time frame in real time, and calculates the global location score $\Psi_k$ at the current time frame k in real time. When $\Psi_k > \Psi_{threshold}$, it can be judged that the global location of the service robot is accurate and reliable, and the forbidden zones and forbidden lines preset in the global map of the working scenario through the software also restrict the service robot from entering these physical forbidden zones. At the same time, considering the continuity of the motion of the service robot, the pose estimation $P_k=[p_k \; q_k \; \theta_k]^T$ at the current time frame k can provide a respective possible position and heading angle constraint for the next time frame k+1, so as to constantly execute the global location algorithm to acquire the optimal pose estimation at different time frames. But when $\Psi_k < \Psi_{threshold}$, it can be judged that the service robot is in an abnormal state, such as getting lost. In such case, the pose estimation $P_k=[p_k \; q_k \; \theta_k]^T$ at the current time frame k of the service robot may be inaccurate, and then the forbidden zones and forbidden lines preset in the map also lose the ability to limit and constrain. At this time, the service robot may try to travel into the physical forbidden zone in the working scenario. In such case, the service robot can detect the presence of the artificial identification by detection apparatus thereof, so as to judge whether it is close to the physical forbidden zone, and the possible position and heading angle information relative to the physical forbidden zone. And because the absolute positions of these artificial identifications in the global map of the working scenario are known and do not change, the Monte Carlo location algorithm can be applied so as to acquire the optimal pose estimation at the current time frame according to the possible position and heading angle information of the service robot and further on the basis of the built global map and the laser data at the current time frame, and thus the accurate global location of the service robot is achieved.

Those skilled in the art should understand that the above embodiments are only for the purpose of clearly illustrating the present disclosure, rather than limiting the scope of the present disclosure. For those skilled in the art, other changes or modifications may also be made on the basis of the above disclosure, and these changes or modifications are still within the scope of the present disclosure.

What is claimed is:

1. A method for detecting a physical forbidden zone and global relocating of a service robot, the method comprising:
presetting an artificial identification on an edge of the physical forbidden zone that the service robot is not allowed to enter in a working scenario;
constantly detecting whether there is the artificial identification in the working scenario by a detection apparatus of the service robot during operations of the service robot;
identifying the artificial identification and confirming position and heading angle information of the service robot relative to the artificial identification when there is artificial identification information in the working scenario;
controlling a motion trajectory of the service robot according to the position and heading angle information of the service robot relative to the artificial identification to forbid the service robot from entering the physical forbidden zone; and
acquiring a possible position and heading angle range of the service robot in a global map of the working scenario according to an absolute position of the artificial identification in the global map, and achieving that an global relocation of the service robot is accurate,
wherein achieving that the global relocation of the service robot is accurate comprises:
S1: acquiring an optimal pose estimation at an current time frame, where the optimal pose estimation is expressed as $P_k=[p_k \ q_k \ \theta_k]^T$, $p_k$ and $q_k$ represent a coordinate position of the service robot in a global coordinate system at the current time frame, $\theta_k$, represents a heading angle of the service robot in the global coordinate system at the current time frame, and k represents the current time frame;
S2: calculating a global location score $\Psi_k$, at the current time frame according to the optimal pose estimation; and
S3: indicating that the global relocation of the service robot is accurate, when the global location score is greater than a certain threshold,
wherein the S1 comprises:
scanning the working scenario by a navigation 2D laser sensor of the service robot to acquire navigation sensor data at the current time frame;
detecting the artificial identification, calculating the position and heading angle information of the service robot relative to the artificial identification, and acquiring the possible position and heading angle range of the service robot in the global map according to the global absolute position of the artificial identification; and
applying a Monte Carlo location algorithm to acquire the optimal pose estimation, based on the navigation sensor data, a built global map, and the possible position and heading angle range.

2. The method of claim 1, wherein the artificial identification comprises one or more of an RFID tag, a UWB tag, a magnetic strip, a two-dimensional code or a color identification card; and the detection apparatus comprises one or more of an RFID reader, a UWB base station, a Hall sensor, and a camera having an image processing module,
wherein the detection apparatus comprises the RFID reader when the artificial identification comprises the RFID tag;
the detection apparatus comprises the UWB base station when the artificial identification comprises the UWB tag;
the detection apparatus comprises the Hall sensor when the artificial identification comprises the magnetic strip; and
the detection apparatus comprises the camera having the image processing module when the artificial identification comprises the two-dimensional code or the color identification card.

* * * * *